US012096790B2

(12) United States Patent
Batista et al.

(10) Patent No.: US 12,096,790 B2
(45) Date of Patent: Sep. 24, 2024

(54) INDUCTIVE HEATING ARRANGEMENT HAVING AN ANNULAR CHANNEL

(71) Applicant: Philip Morris Products S.A., Neuchatel (CH)

(72) Inventors: Rui Nuno Batista, Neuchatel (CH); Ricardo Cali, Mannheim (DE); Jerome Christian Courbat, Neuchatel (CH); Oleg Mironov, Neuchatel (CH); Enrico Stura, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 326 days.

(21) Appl. No.: 17/624,526

(22) PCT Filed: Jul. 3, 2020

(86) PCT No.: PCT/EP2020/068837
§ 371 (c)(1),
(2) Date: Jan. 3, 2022

(87) PCT Pub. No.: WO2021/001541
PCT Pub. Date: Jan. 7, 2021

(65) Prior Publication Data

US 2022/0240586 A1 Aug. 4, 2022

(30) Foreign Application Priority Data

Jul. 4, 2019 (EP) .................................... 19184538

(51) Int. Cl.
*A24F 40/465* (2020.01)
*A24F 40/57* (2020.01)
(Continued)

(52) U.S. Cl.
CPC ............ *A24F 40/465* (2020.01); *A24F 40/57* (2020.01); *H05B 6/40* (2013.01); *H05B 6/44* (2013.01); *A24F 40/20* (2020.01)

(58) Field of Classification Search
CPC ........ A24F 40/465; A24F 40/57; A24F 40/20; H05B 6/40; H05B 6/44; H05B 6/108; H05B 6/365; H05B 6/105; H01F 27/30
See application file for complete search history.

(56) References Cited

U.S. PATENT DOCUMENTS

| | | | |
|---|---|---|---|
| 5,613,505 | A | 3/1997 | Campbell et al. |
| 2007/0246459 | A1 | 10/2007 | Loveless et al. |

(Continued)

FOREIGN PATENT DOCUMENTS

| | | | |
|---|---|---|---|
| CN | 108617042 | A | 10/2018 |
| EP | 0 808 079 | A1 | 11/1997 |

(Continued)

OTHER PUBLICATIONS

International Search Report and Written Opinion issued on Oct. 1, 2020 in PCT/EP2020/068837 filed Jul. 3, 2020, 10 pages.

(Continued)

*Primary Examiner* — Truc T Nguyen
(74) *Attorney, Agent, or Firm* — Oblon, McClelland, Maier & Neustadt, L.L.P.

(57) ABSTRACT

An inductive heating arrangement is provided, including: a first inductor coil to generate a first varying magnetic field when a varying electric current flows through the first coil; a second inductor coil to generate a second varying magnetic field when a varying electric current flows through the second coil; and a tubular-shaped flux concentrator around the first coil and to distort the first field, including a main portion around the first coil and having an inner diameter, first and second ends, a first end portion having an inner
(Continued)

diameter smaller than that of the main portion, and a second end portion having an inner diameter smaller than that of the main portion, an inner surface of the flux concentrator defining an annular channel between the first and second end portions, and the first inductor coil being disposed within the annular channel between the first and second end portions.

13 Claims, 4 Drawing Sheets

(51) Int. Cl.

| | |
|---|---|
| ***H05B 6/40*** | (2006.01) |
| ***H05B 6/44*** | (2006.01) |
| *A24F 40/20* | (2020.01) |

(56) References Cited

U.S. PATENT DOCUMENTS

| | | | | |
|---|---|---|---|---|
| 2008/0099468 | A1 | 5/2008 | Loveless et al. | |
| 2008/0099469 | A1 | 5/2008 | Loveless et al. | |
| 2017/0022868 | A1 | 1/2017 | Crawford et al. | |
| 2019/0182909 | A1 | 6/2019 | Fursa et al. | |
| 2022/0386698 | A1* | 12/2022 | Batista | H05B 6/44 |
| 2023/0210186 | A1* | 7/2023 | Fursa | H05B 6/108 131/329 |
| 2023/0404156 | A1* | 12/2023 | Batista | A24F 40/20 |
| 2024/0041121 | A1* | 2/2024 | Butin | A24F 40/465 |
| 2024/0049795 | A1* | 2/2024 | Batista | H05B 6/105 |

FOREIGN PATENT DOCUMENTS

| | | | |
|---|---|---|---|
| EP | 1 867 211 | | 12/2007 |
| JP | 2008-226780 | A | 9/2008 |
| JP | 2018-513059 | A | 5/2018 |
| RU | 2 670 534 | C1 | 10/2018 |
| RU | 2 678 893 | C1 | 2/2019 |
| WO | WO 95/27411 | A1 | 10/1995 |
| WO | WO 2015/131058 | A1 | 9/2015 |
| WO | WO 2017/001819 | A1 | 1/2017 |
| WO | WO 2018/041450 | A1 | 3/2018 |
| WO | WO 2018/073376 | A1 | 4/2018 |
| WO | WO 2018/211035 | A1 | 11/2018 |

OTHER PUBLICATIONS

Combined Russian Office Action and Search Report issued Oct. 18, 2023 in Russian Patent Application No. 2022102597/.3 (with English Translation), 15 pages.

Extended European Search Report issued Jan. 28, 2020 in corresponding European Patent Application No. 19184538.7, 7 pages.

Japanese Office Action mailed on Jun. 25, 2024 issued in Japanese Patent Application No. 2021-577149, with English Translation, total 5 pages.

* cited by examiner

INDUCTIVE HEATING ARRANGEMENT HAVING AN ANNULAR CHANNEL

The present invention relates to an inductive heating arrangement comprising an annular channel. The present invention also relates to an aerosol-generating device comprising the inductive heating arrangement.

A number of electrically-operated aerosol-generating systems in which an aerosol-generating device having an electric heater is used to heat an aerosol-forming substrate, such as a tobacco plug, have been proposed in the art. One aim of such aerosol-generating systems is to reduce known harmful smoke constituents of the type produced by the combustion and pyrolytic degradation of tobacco in conventional cigarettes. Typically, the aerosol-generating substrate is provided as part of an aerosol-generating article which is inserted into a cavity in the aerosol-generating device. In some known systems, to heat the aerosol-forming substrate to a temperature at which it is capable of releasing volatile components that can form an aerosol, a resistive heating element such as a heating blade is inserted into or around the aerosol-forming substrate when the article is received in the aerosol-generating device. In other aerosol-generating systems, an inductive heater is used rather than a resistive heating element. The inductive heater typically comprises an inductor coil forming part of the aerosol-generating device and a susceptor arranged such that it is in thermal proximity to the aerosol-forming substrate. The inductor coil generates a varying magnetic field to generate eddy currents and hysteresis losses in the susceptor, causing the susceptor to heat up, thereby heating the aerosol-forming substrate.

Inductive heating allows aerosol to be generated without exposing the inductor coil to the aerosol-generating article. This can improve the ease with which the device may be cleaned. However, with inductive heating, the inductor coil may also cause eddy currents and hysteresis losses in adjacent parts of the aerosol-generating device. This can reduce the efficiency of the inductive heater, therefore reducing the efficiency of the aerosol-generating device. This may also lead to undesirable heating of adjacent parts of the aerosol-generating device. This may be a particular problem in aerosol-generating devices comprising more than one inductor coil, wherein each inductor coil is arranged to heat different portions of a susceptor or different susceptors. For example, the varying magnetic field generated by a first inductor coil may induce an electrical current in a second inductor coil, which may in turn heat a susceptor arranged to be heated using the second inductor coil only.

It would be desirable to provide an inductive heating arrangement that mitigates or overcomes these problems with known systems.

According to this disclosure there is provided an inductive heating arrangement. The inductive heating arrangement may comprise an inductor coil. The inductor coil may be arranged to generate a varying magnetic field when a varying electric current flows through the inductor coil. The inductive heating arrangement may comprise a flux concentrator. The flux concentrator may be positioned around the inductor coil. The flux concentrator may distort the varying magnetic field generated by the inductor coil. The flux concentrator may have a tubular shape. The flux concentrator may comprise a main portion positioned around the inductor coil. The main portion may have an inner diameter. The main portion may have a first end. The main portion may have a second end. The flux concentrator may comprise a first end portion. The first end portion may be at the first end of the main portion. The first end portion may have an inner diameter. The inner diameter of the first end portion may be smaller than the inner diameter of the main portion. The flux concentrator may comprise a second end portion. The second end portion may be at the second end of the main portion. The second end portion may have an inner diameter. The inner diameter of the second end portion may be smaller than the inner diameter of the main portion. An inner surface of the flux concentrator may define an annular channel between the first end portion and the second end portion. The inductor coil may be positioned within the annular channel between the first end portion and the second end portion.

According to this disclosure there is provided an inductive heating arrangement. The inductive heating arrangement comprises an inductor coil arranged to generate a varying magnetic field when a varying electric current flows through the inductor coil. The inductive heating arrangement also comprises a flux concentrator positioned around the inductor coil to distort the varying magnetic field generated by the inductor coil. The flux concentrator has a tubular shape and comprises a main portion positioned around the inductor coil. The main portion has an inner diameter, a first end and a second end. The flux concentrator also comprises a first end portion at the first end of the main portion. The first end portion has an inner diameter, wherein the inner diameter of the first end portion is smaller than the inner diameter of the main portion. The flux concentrator also comprise a second end portion at the second end of the main portion. The second end portion has an inner diameter, wherein the inner diameter of the second end portion is smaller than the inner diameter of the main portion. An inner surface of the flux concentrator defines an annular channel between the first end portion and the second end portion. The inductor coil is positioned within the annular channel between the first end portion and the second end portion.

According to this disclosure there is provided an inductive heating arrangement. The inductive heating arrangement may comprise an inductor coil. The inductor coil may be arranged to generate a varying magnetic field when a varying electric current flows through the inductor coil. The inductive heating arrangement may comprise a flux concentrator. The flux concentrator may be positioned around the inductor coil. The flux concentrator may distort the varying magnetic field generated by the inductor coil. The flux concentrator may have a tubular shape. The flux concentrator may comprise an annular channel defined by an inner surface of the flux concentrator. The inductor coil may be positioned within the annular channel.

According to this disclosure there is provided an inductive heating arrangement comprising an inductor coil and a flux concentrator. The inductor coil is arranged to generate a varying magnetic field when a varying electric current flows through the inductor coil. The flux concentrator is positioned around the inductor coil to distort the varying magnetic field generated by the inductor coil. The flux concentrator has a tubular shape and comprises an annular channel defined by an inner surface of the flux concentrator. The inductor coil is positioned within the annular channel.

The flux concentrator may comprises a main portion positioned around the inductor coil, the main portion having an inner diameter, a first end and a second end. The flux concentrator may also comprise a first end portion at the first end of the main portion. The first end portion has an inner diameter, wherein the inner diameter of the first end portion is smaller than the inner diameter of the main portion. The flux concentrator may also comprise a second end portion at the second end of the main portion. The second end portion has an inner diameter, wherein the inner diameter of the second end portion is smaller than the inner diameter of the main portion. The annular channel may be defined between the first end portion and the second end portion.

According to this disclosure there is provided an inductive heating arrangement. The inductive heating arrangement may comprise an inductor coil. The inductor coil may be arranged to generate a varying magnetic field when a varying electric current flows through the inductor coil. The inductive heating arrangement may comprise a flux concentrator positioned around the inductor coil. The flux concentrator may be arranged to distort the varying magnetic field generated by the inductor coil. The flux concentrator may have a tubular shape. The flux concentrator and the inductor coil may be positioned concentrically about a longitudinal axis. A cross-sectional shape of the flux concentrator in a longitudinal direction along the longitudinal axis may comprise a U-shaped portion. The inductor coil may be positioned within the U-shaped portion.

According to this disclosure there is provided an inductive heating arrangement comprising an inductor coil and a flux concentrator. The inductor coil is arranged to generate a varying magnetic field when a varying electric current flows through the inductor coil. The flux concentrator is positioned around the inductor coil to distort the varying magnetic field generated by the inductor coil. The flux concentrator has a tubular shape. The flux concentrator and the inductor coil are positioned concentrically about a longitudinal axis. A cross-sectional shape of the flux concentrator in a longitudinal direction along the longitudinal axis comprises a U-shaped portion. The inductor coil is positioned within the U-shaped portion.

The inductor coil may be a first inductor coil arranged to generate a first varying magnetic field when a varying electric current flows through the first inductor coil. The inductive heating arrangement may comprise a second inductor coil arranged to generate a second varying magnetic field when a varying electric current flows through the second inductor coil.

The cross-sectional shape of the flux concentrator in the longitudinal direction may comprise a first U-shaped portion in which the first inductor coil is positioned and a second U-shaped portion in which the second inductor coil is positioned.

The flux concentrator may be a first flux concentrator positioned around the first inductor coil. The inductive heating arrangement may comprise a second flux concentrator positioned around the second inductor coil to distort the second varying magnetic field generated by the second inductor coil. The second flux concentrator may have a tubular shape, wherein the second flux concentrator and the second inductor coil are positioned concentrically about the longitudinal axis. A cross-sectional shape of the second flux concentrator in the longitudinal direction may comprise a U-shaped portion in which the second inductor coil is positioned.

As used herein, the term "aerosol-forming substrate" refers to a substrate capable of releasing volatile compounds that can form an aerosol. Such volatile compounds may be released by heating the aerosol-forming substrate. An aerosol-forming substrate is typically part of an aerosol-generating article.

As used herein, the term "aerosol-generating article" refers to an article comprising an aerosol-forming substrate that is capable of releasing volatile compounds that can form an aerosol. For example, an aerosol-generating article may be an article that generates an aerosol that is directly inhalable by the user drawing or puffing on a mouthpiece at a proximal or user-end of the system. An aerosol-generating article may be disposable. An article comprising an aerosol-forming substrate comprising tobacco may be referred to herein as a tobacco stick.

As used herein, the term "aerosol-generating device" refers to a device that interacts with an aerosol-forming substrate to generate an aerosol.

As used herein, the term "aerosol-generating system" refers to the combination of an aerosol-generating device with an aerosol-generating article. In the aerosol-generating system, the aerosol-generating article and the aerosol-generating device cooperate to generate an aerosol.

As used herein, the term "length" refers to the major dimension in a longitudinal direction of an inductive heating arrangement, an aerosol-generating device or an aerosol-generating article, or a component of the inductive heating arrangement, the aerosol-generating device or the aerosol-generating article.

As used herein, the term "longitudinal cross-section" is used to describe the cross-section of an inductive heating arrangement, an aerosol-generating device or an aerosol-generating article, or a component of the inductive heating arrangement, the aerosol-generating device or the aerosol-generating article, in the longitudinal direction.

The inductive heating arrangements according to this disclosure comprise a flux concentrator. Advantageously, the flux concentrator distorts the varying magnetic field generated by the inductor coil. Advantageously, distorting the varying magnetic field may concentrate or focus the varying magnetic field. For example, the flux concentrator may concentrate or focus the varying magnetic field towards a susceptor. Advantageously, this may increase a level of heat generated in the susceptor for a given electric current within the inductor coil.

The flux concentrator defines an annular channel or a U-shaped portion in which the inductor coil is received.

Advantageously, the annular channel or the U-shaped portion may reduce or minimise the extent to which the varying magnetic field propagates beyond the inductor coil. In other words, the annular channel or the U-shaped portion may function as a magnetic shield. Advantageously, this may reduce undesired induction of electric current in adjacent electrically conductive parts.

Advantageously, the annular channel or the U-shaped portion may facilitate retention of the inductor coil within the flux concentrator. For example, the inductor coil may be retained within the annular channel or the U-shaped portion by an interference fit.

The inductor coil may be a first inductor coil arranged to generate a first varying magnetic field when a varying electric current flows through the first inductor coil. The inductive heating arrangement may comprise a second inductor coil arranged to generate a second varying magnetic field when a varying electric current flows through the second inductor coil.

Advantageously, first and second inductor coils may facilitate separate heating of first and second susceptors. Advantageously, first and second inductor coils may facilitate separate heating of first and second portions of a single susceptor. Advantageously, first and second inductor coils may facilitate separate heating of first and second aerosol-forming substrates. Advantageously, first and second inductor coils may facilitate separate heating of first and second portions of a single aerosol-forming substrate.

The flux concentrator may be a first flux concentrator, wherein the main portion is a first main portion positioned around the first inductor coil and the annular channel is a first annular channel. The inductive heating arrangement may comprise a second flux concentrator positioned around the second inductor coil to distort the second varying magnetic field generated by the second inductor coil, wherein the second flux concentrator has a tubular shape. The second flux concentrator may comprises a second main portion positioned around the second inductor coil, the second main portion having an inner diameter, a first end and a second end. The second flux concentrator may comprise a third end portion at the first end of the second main portion, the third end portion having an inner diameter, wherein the inner diameter of the third end portion is than the inner diameter of the second main portion. The second flux concentrator may also comprise a fourth end portion at the second end of the second main portion, the fourth end portion having an inner diameter, wherein the inner diameter of the fourth end portion is smaller than the inner diameter of the second main portion. An inner surface of the second flux concentrator may define a second annular channel between the third end portion and the fourth end portion, wherein the second inductor coil is positioned within the second annular channel between the third end portion and the fourth end portion.

Advantageously, the first and second end portions of the first flux concentrator may facilitate magnetic shielding of the second inductor coil from the varying magnetic field generated by the first inductor coil. Advantageously, this may reduce or minimise the induction of an electric current in the second inductor coil by the varying magnetic field generated by the first inductor coil.

Advantageously, the third and fourth end portions of the second flux concentrator may facilitate magnetic shielding of the first inductor coil from the varying magnetic field generated by the second inductor coil. Advantageously, this may reduce or minimise the induction of an electric current in the first inductor coil by the varying magnetic field generated by the second inductor coil.

The flux concentrator may be positioned around the first inductor coil and the second inductor coil to distort the first and second varying magnetic fields generated by the first and second inductor coils. The main portion of the flux concentrator may be a first main portion positioned around the first inductor coil and the annular channel may be a first annular channel. The flux concentrator may comprise a second main portion positioned around the second inductor coil, the second main portion having an inner diameter, a first end and a second end. The flux concentrator may comprise a third end portion at the first end of the second main portion, the third end portion having an inner diameter, wherein the inner diameter of the third end portion is smaller than the inner diameter of the second main portion. The second end portion may be at the second end of the second main portion so that the second end portion is positioned between the first main portion and the second main portion. The inner diameter of the second end portion is smaller than the inner diameter of the second main portion. The inner surface of the flux concentrator may define a second annular channel between the second end portion and the third end portion. The second inductor coil may be positioned within the second annular channel between the second end portion and the third end portion.

Advantageously, the first and second end portions of the flux concentrator may facilitate magnetic shielding of the second inductor coil from the varying magnetic field generated by the first inductor coil. Advantageously, this may reduce or minimise the induction of an electric current in the second inductor coil by the varying magnetic field generated by the first inductor coil.

Advantageously, the second and third end portions of the flux concentrator may facilitate magnetic shielding of the first inductor coil from the varying magnetic field generated by the second inductor coil. Advantageously, this may reduce or minimise the induction of an electric current in the first inductor coil by the varying magnetic field generated by the second inductor coil.

The inductor coil and the annular channel may be positioned concentrically about a longitudinal axis. A cross-sectional shape of the annular channel in a longitudinal direction along the longitudinal axis may be U-shaped. The U-shaped cross-sectional shape may be a rectangular U-shaped cross-sectional shape. The rectangular U-shaped cross-sectional shape may comprise a central segment defining the main portion of the flux concentrator. The rectangular U-shaped cross-sectional shape may comprise a first end segment extending substantially orthogonally with respect to the main portion and defining the first end portion of the flux concentrator. The rectangular U-shaped cross-sectional shape may comprise a second end segment extending substantially orthogonally with respect to the main portion and defining the second end portion of the flux concentrator.

In embodiments in which the inductive heating arrangement comprises a second annular channel and a second inductor coil, the second inductor coil and the second annular channel may be positioned concentrically about the longitudinal axis. A cross-sectional shape of the second annular channel in the longitudinal direction may be U-shaped. The U-shaped cross-sectional shape may be a rectangular U-shaped cross-sectional shape.

The inductor coil and the annular channel defined by the flux concentrator may be positioned concentrically about a longitudinal axis. The flux concentrator may be formed from a discrete first part having a semi-annular shape and a discrete second part having a semi-annular shape, wherein the first part and the second part together define the tubular shape of the flux concentrator.

Advantageously, forming the flux concentrator from first and second parts each having a semi-annular shape may facilitate assembly of the inductive heating arrangement. For example, the flux concentrator may be assembled around the inductor coil by positioning the first and second parts around the inductor coil.

In embodiments in which the inductive heating arrangement comprises a first flux concentrator and a second flux concentrator, at least one of the first flux concentrator and the second flux concentrator may be formed from a discrete first part having a semi-annular shape and a discrete second part having a semi-annular shape, wherein the first part and the second part together define the tubular shape of the flux concentrator. The first flux concentrator and the second flux concentrator may each be formed from a discrete first part having a semi-annular shape and a discrete second part having a semi-annular shape, wherein the first part and the second part together define the tubular shape of the flux concentrator.

The flux concentrator may comprise a plurality of discrete annular segments positioned consecutively to define the tubular shape of the flux concentrator.

Advantageously, forming the flux concentrator from a plurality of discrete annular segments may facilitate assembly of the inductive heating arrangement. For example, the flux concentrator may be assembled around the inductor coil by positioning successive discrete annular segments around the inductor coil.

The inductive heating arrangement may comprise a first discrete annular segment defining the first end portion of the flux concentrator. The inductive heating arrangement may comprise a second discrete annular segment defining the second end portion of the flux concentrator. The inductive heating arrangement may comprise at least one intermediate discrete annular segment defining the main portion of the flux concentrator.

In embodiments in which the flux concentrator comprises a first main portion and a second main portion, the at least one intermediate discrete annular segment may comprise at least one first intermediate discrete annular segment defining the first main portion and at least one second intermediate discrete annular segment defining the second main portion. The inductive heating arrangement may comprise a third discrete annular segment defining the third end portion of the flux concentrator.

In embodiments in which the inductive heating arrangement comprises a first flux concentrator and a second flux concentrator, at least one of the first flux concentrator and the second flux concentrator may comprise a plurality of discrete annular segments positioned consecutively to define the tubular shape of the flux concentrator. The first flux concentrator and the second flux concentrator may each comprise a plurality of discrete annular segments positioned consecutively to define the tubular shape of the flux concentrator.

The at least one intermediate discrete annular segment may be at least one first intermediate discrete annular segment defining the first main portion of the first flux concentrator. The inductive heating arrangement may comprise a third discrete annular segment defining the third end portion of the second flux concentrator. The inductive heating arrangement may comprise a fourth discrete annular segment defining the fourth end portion of the second flux concentrator. The inductive heating arrangement may comprise at least one second intermediate discrete annular segment defining the second main portion of the second flux concentrator.

Preferred and optional features of flux concentrators for inductive heating arrangements according to the present disclosure will now be described. In embodiments in which the inductive heating arrangement comprises a first flux concentrator and a second flux concentrator, each of the preferred and optional features may apply to the first flux concentrator, the second flux concentrator, or the first flux concentrator and the second flux concentrator.

Preferably, a flux concentrator has a high relative magnetic permeability. Advantageously, a high relative magnetic permeability acts to concentrate or focus the varying magnetic field generated by the inductor coil.

As used herein and within the art, the term "relative magnetic permeability" refers to the ratio of the magnetic permeability of a material, or of a medium, such as the flux concentrator, to the magnetic permeability of free space, "$\mu_0$", where $\mu_0$ is $4\pi\times10^{-7}$ Newtons per square ampere.

Preferably, a flux concentrator has a relative magnetic permeability of at least about 5 at 25 degrees Celsius, for example at least about 10, at least about 20, at least about 30, at least about 40, at least about 50, at least about 60, at least about 80, or at least about 100. These example values refer to the values of relative magnetic permeability for a frequency of between 6 and 8 megahertz and a temperature of 25 degrees Celsius.

A flux concentrator may be formed from any suitable material or combination of materials. Preferably, a flux concentrator comprises a ferromagnetic material. A flux concentrator may comprise a ferrite material, a ferrite powder held in a binder, or any other suitable material including ferrite material. Suitable ferrite materials include ferritic iron, ferromagnetic steel, and stainless steel.

Preferred and optional features of inductor coils for inductive heating arrangements according to the present disclosure will now be described. In embodiments in which the inductive heating arrangement comprises a first inductor coil and a second inductor coil, each of the preferred and optional features may apply to the first inductor coil, the second inductor coil, or the first inductor coil and the second inductor coil.

An inductor coil generates a varying magnetic field when a varying electric current is supplied to the inductor coil. In preferred embodiments, the varying electric current is an alternating electric current. The inductor coil generates an alternating magnetic field when an alternating electric current is supplied to the inductor coil. Therefore, in preferred embodiments, the term "varying electric current" is an alternating electric current, and the term "varying magnetic field" is an alternating magnetic field.

Preferably, an inductor coil is a tubular inductor coil. An inductor coil may be helically wound about a longitudinal axis. An inductor coil may be elongate. Particularly preferably, an inductor coil may be an elongate tubular inductor coil. An inductor coil may have any suitable transverse cross-section. For example, an inductor coil may have a circular, elliptical, square, rectangular, triangular or other polygonal transverse cross-section.

An inductor coil may be formed from any suitable material. An inductor coil is formed from an electrically conductive material. Preferably, the inductor coil is formed from a metal or a metal alloy.

In some embodiments, the second inductor coil is substantially identical to the first inductor coil. In other words, the first inductor coil and the second inductor coil have the same shape, dimensions and number of turns. Advantageously, identical first and second inductor coils may simplify the manufacture of the inductive heating arrangement.

In some embodiments, the second inductor coil is different to the first inductor coil. For example, the second inductor coil may have at least one of a different length, a different number of turns or a different transverse cross-section to the first inductor coil. Advantageously, different first and second inductor coils may generating different varying magnetic fields. Advantageously, different varying magnetic fields may be used to heat different portions of a susceptor to different temperatures. Advantageously, different varying magnetic fields may be used to heat different susceptors to different temperatures.

The first inductor coil and the second inductor coil may be arranged in any suitable arrangement. Particularly preferably, the first inductor coil and the second inductor coil are coaxially aligned along an axis. Where the first inductor coil and the second inductor coil are elongate tubular inductor coils, the first inductor coil and the second inductor coil may be coaxially aligned along a longitudinal axis.

The inductive heating arrangement may comprise a susceptor. As used herein, the term "susceptor" refers to an element comprising a material that is capable of converting magnetic energy into heat. When a susceptor is located in a varying magnetic field, the susceptor is heated. Heating of the susceptor may be the result of at least one of hysteresis losses and eddy currents induced in the susceptor, depending on the electrical and magnetic properties of the susceptor material.

Preferably, the inductor coil is positioned around at least a portion of the susceptor.

In embodiments in which the inductive heating arrangement comprises a first inductor coil and a second inductor coil, the first inductor coil may be positioned around a first portion of the susceptor and the second inductor coil may be positioned around a second portion of the susceptor.

The susceptor may be a first susceptor, wherein the first inductor coil is positioned around at least a portion of the first susceptor. The inductive heating arrangement may comprise a second susceptor, wherein the second inductor coil is positioned around at least a portion of the second susceptor.

Preferably, the inductive heating arrangement comprises a separation between the first susceptor and the second susceptor, wherein the separation thermally insulates the first susceptor from the second susceptor. The separation may be any suitable size to thermally insulate the first susceptor from the second susceptor.

The inductive heating arrangement may comprise an intermediate element disposed between the first susceptor and the second susceptor. The intermediate element may be disposed in the separation between the first susceptor and the second susceptor. The intermediate element may extend between the first susceptor and the second susceptor. The intermediate element may contact an end of the first susceptor. The intermediate element may contact an end of the second susceptor. The intermediate element may be secured to an end of the first susceptor. The intermediate element may be secured to an end of the second susceptor. The intermediate element may connect the second susceptor to the first susceptor.

In some preferred embodiments, the first susceptor and the second susceptor are tubular susceptors, and the intermediate element is a tubular intermediate element. In these embodiments, the tubular first susceptor, the tubular second susceptor and the tubular intermediate element may be substantially aligned.

The intermediate element may be formed from any suitable material. The intermediate element may comprise a thermally insulating material for thermally insulating the first susceptor from the second susceptor. Suitable materials include polyether ether ketone, liquid crystal polymers, cements, glasses, zirconium dioxide, silicon nitride, aluminium oxide, and combinations thereof.

Preferred and optional features of susceptors for inductive heating arrangements according to the present disclosure will now be described. In embodiments in which the inductive heating arrangement comprises a first susceptor and a second susceptor, each of the preferred and optional features may apply to the first susceptor, the second susceptor, or the first susceptor and the second susceptor.

Preferably, a susceptor is a tubular susceptor. Preferably, a tubular susceptor defines a cavity for receiving at least a portion of an aerosol-forming substrate. The cavity may be open at one end. The cavity may be open at both ends.

Where a susceptor is a tubular susceptor defining a cavity that is open at one end or both ends, preferably the susceptor is substantially impermeable to gas from an outer surface of the susceptor to an inner surface of the susceptor. In other words, preferably the susceptor is substantially impermeable to gas through the sidewalls of the susceptor.

A susceptor may comprise any suitable material. A susceptor may be formed from any material that can be inductively heated to a temperature sufficient to aerosolise an aerosol-forming substrate. Preferred susceptors may be heated to a temperature in excess of about 250 degrees Celsius. Preferred susceptors may be formed from an electrically conductive material. As used herein, "electrically conductive" refers to materials having an electrical resistivity of less than or equal to $1\times10^{-4}$ ohm metres at 20 Celsius. Preferred susceptors may be formed from a thermally conductive material. As used herein, the term "thermally conductive material" is used to describe a material having a thermal conductivity of at least 10 watts per metre Kelvin at 23 degrees Celsius and a relative humidity of 50 percent as measured using the modified transient plane source (MTPS) method.

Suitable materials for a susceptor include graphite, molybdenum, silicon carbide, stainless steels, niobium, aluminium, nickel, nickel containing compounds, titanium, and composites of metallic materials. Some preferred susceptors comprise a metal or carbon. Some preferred susceptors comprise a ferromagnetic material, for example, ferritic iron, a ferromagnetic alloy, such as ferromagnetic steel or stainless steel, ferromagnetic particles, and ferrite. Some preferred susceptors consist of a ferromagnetic material. A suitable susceptor may comprise aluminium. A suitable susceptor may consist of aluminium. A susceptor may comprise at least about 5 percent, at least about 20 percent, at least about 50 percent or at least about 90 percent of ferromagnetic or paramagnetic materials.

According to the present disclosure there is provided an aerosol-generating device comprises any of the inductive heating arrangements described herein.

The aerosol-generating device may comprise a power supply. Preferably, the aerosol-generating device comprises a power supply.

The aerosol-generating device may comprise a controller. The controller may be arranged to supply a varying electric current from the power supply to each inductor coil. Preferably, the aerosol-generating device comprises a controller arranged to supply a varying electric current from the power supply to each inductor coil.

The power supply may be a DC power supply. In some preferred embodiments, the power supply is a battery, such as a rechargeable lithium ion battery. The power supply may be another form of charge storage device, such as a capacitor. The power supply may require recharging. The power supply may have a capacity that allows for the storage of enough energy for one or more uses of the device. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of uses of the device or discrete activations. In one embodiment, the power supply is a DC power supply having a DC supply voltage in the range of about 2.5 Volts to about 4.5 Volts and a DC supply current in the range of about 1 Amp to about 10 Amps (corresponding to a DC power supply in the range of about 2.5 Watts to about 45 Watts).

The controller may comprise a microprocessor, which may be a programmable microprocessor, a microcontroller, or an application specific integrated chip (ASIC) or other electronic circuitry capable of providing control. The controller may comprise further electronic components. The controller may be configured to regulate a supply of current to each inductor coil. Current may be supplied to the inductor coil continuously following activation of the aerosol-generating device or may be supplied intermittently, such as on a puff by puff basis.

The controller may be configured to supply a varying electric current to the inductor coil having a frequency of between about 5 kilohertz and about 500 kilohertz.

The controller may be configured to supply a high frequency varying current to the inductor coil. As used herein, the term “high frequency varying current” means a varying current having a frequency of between about 500 kilohertz and about 30 megahertz. The high frequency varying current may have a frequency of between about 1 megahertz and about 30 megahertz, such as between about 1 megahertz and about 10 megahertz, or such as between about 5 megahertz and about 8 megahertz.

In embodiments in which the inductive heating arrangement comprises a first inductor coil and a second inductor coil, the controller may supply a first varying electric current to the first inductor coil for a first time period, and the controller may supply a second varying electric current to the second inductor coil for a second time period.

The first time period may be the same as the second time period. In other words, the controller may supply the first and second varying electric currents concurrently.

The first time period may be different to the second time period. The first time period may be longer than the second time period. The first time period may be shorter than the second time period. The first time period may partially overlap the second time period. The first time period may entirely overlap the second time period. There may be no overlap between the first time period and the second time period. The first time period and the second time period may be consecutive.

The controller may advantageously comprise a DC/AC inverter. The DC/AC inventor may comprise a Class-C, Class-D or Class-E power amplifier.

The aerosol-generating device may comprise a device housing. The device housing may be elongate. The device housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The device housing may define an inductive heating chamber. Preferably, the inductive heating arrangement is positioned within the inductive heating chamber.

The device housing may comprises an air inlet. The air inlet may be configured to enable ambient air to enter the device housing. The device housing may comprise any suitable number of air inlets. The device housing may comprise a plurality of air inlets.

The device housing may comprise an air outlet. The air outlet may be configured to enable air to enter the device cavity from within the device housing. The device housing may comprise any suitable number of air outlets. The device housing may comprise a plurality of air outlets.

In some embodiments, the aerosol-generating device housing comprises a mouthpiece. The mouthpiece may comprise at least one air inlet and at least one air outlet. The mouthpiece may comprise more than one air inlet. One or more of the air inlets may reduce the temperature of the aerosol before it is delivered to a user and may reduce the concentration of the aerosol before it is delivered to a user.

The aerosol-generating device may comprise a temperature sensor. The temperature sensor may be arranged to sense a temperature of the inductive heating arrangement. In embodiments in which the inductive heating arrangement comprises a susceptor, the temperature sensor may be arranged to sense a temperature of the susceptor. In embodiments in which the inductive heating arrangement comprises a first susceptor and a second susceptor, the aerosol-generating device may comprise a first temperature sensor arranged to sense the temperature of the first susceptor and a second temperature sensor arranged to sense the temperature of the second susceptor.

The aerosol-generating device may include a user interface to activate the device, for example a button to initiate heating of an aerosol-forming substrate.

The aerosol-generating device may comprise a display to indicate a state of the device or of an aerosol-forming substrate.

The aerosol-generating device may comprise a puff sensor, for sensing a user drawing on the aerosol-generating system.

Preferably, the aerosol-generating device is portable. The aerosol-generating device may have a size comparable to a conventional cigar or cigarette. The aerosol-generating device may have a total length between about 30 millimetres and about 150 millimetres. The aerosol-generating device may have an outer diameter between about 5 millimetres and about 30 millimetres.

According to the present disclosure there is provided an aerosol-generating system comprising any of the aerosol-generating devices described herein.

The aerosol-generating system may further comprise an aerosol-generating article. The aerosol-generating article may comprise an aerosol-forming substrate.

Preferably, the aerosol-generating article is configured to be at least partially received within a cavity of the aerosol-generating device. The inductive heating arrangement may define the cavity for receiving the aerosol-generating article. In embodiments in which the inductive heating arrangement comprises a susceptor, the susceptor may define the cavity.

The aerosol-forming substrate may comprise nicotine. The nicotine-containing aerosol-forming substrate may be a nicotine salt matrix.

The aerosol-forming substrate may be a liquid. The aerosol-forming substrate may comprise solid components and liquid components. Preferably, the aerosol-forming substrate is a solid.

The aerosol-forming substrate may comprise plant-based material. The aerosol-forming substrate may comprise tobacco. The aerosol-forming substrate may comprise a tobacco-containing material including volatile tobacco flavour compounds which are released from the aerosol-forming substrate upon heating. The aerosol-forming substrate may comprise a non-tobacco material. The aerosol-forming substrate may comprise homogenised plant-based material. The aerosol-forming substrate may comprise homogenised tobacco material. Homogenised tobacco material may be formed by agglomerating particulate tobacco. In a particularly preferred embodiment, the aerosol-forming substrate comprises a gathered crimped sheet of homogenised tobacco material. As used herein, the term ‘crimped sheet’ denotes a sheet having a plurality of substantially parallel ridges or corrugations.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers may include polyhydric alcohols or mixtures thereof, such as triethylene glycol, 1,3-butanediol. Preferably, the aerosol former is glycerine. Where present, the homogenised tobacco material may have an aerosol-former content of equal to or greater than 5 percent by weight on a dry weight basis, such as between about 5 percent and about 30 percent by weight on a dry weight basis. The aerosol-forming substrate may comprise other additives and ingredients, such as flavourants.

The aerosol-generating article may have any suitable form. The aerosol-generating article may be substantially cylindrical in shape. The aerosol-generating article may be substantially elongate. The aerosol-generating article may have a length and a circumference substantially perpendicular to the length.

The aerosol-forming substrate may be provided as an aerosol-generating segment containing an aerosol-forming substrate. The aerosol-generating segment may comprise a plurality of aerosol-forming substrates. The aerosol-generating segment may comprise a first aerosol-forming substrate and a second aerosol-forming substrate. In some embodiments, the second aerosol-forming substrate is substantially identical to the first aerosol-forming substrate. In some embodiments, the second aerosol-forming substrate is different from the first aerosol-forming substrate.

Where the aerosol-generating segment comprises a plurality of aerosol-forming substrates, the number of aerosol-forming substrates may be the same as the number of inductor coils in the inductive heating arrangement.

The aerosol-generating segment may be substantially cylindrical in shape. The aerosol-generating segment may be substantially elongate. The aerosol-generating segment may have a length and a circumference substantially perpendicular to the length.

Where the aerosol-generating segment comprises a plurality of aerosol-forming substrates, the aerosol-forming substrates may be arranged end-to-end along an axis of the aerosol-generating segment. In some embodiments, the aerosol-generating segment may comprise a separation between adjacent aerosol-forming substrates.

In some preferred embodiments, the aerosol-generating article may have a total length between about 30 millimetres and about 100 millimetres. In some embodiments, the aerosol-generating article has a total length of about 45 millimetres. The aerosol-generating article may have an outer diameter between about 5 millimetres and about 12 millimetres. In some embodiments, the aerosol-generating article may have an outer diameter of about 7.2 millimetres.

The aerosol-generating segment may have a length of between about 7 millimetres and about 15 millimetres. In some embodiments, the aerosol-generating segment may have a length of about 10 millimetres, or 12 millimetres.

The aerosol-generating segment preferably has an outer diameter that is about equal to the outer diameter of the aerosol-generating article. The outer diameter of the aerosol-generating segment may be between about 5 millimetres and about 12 millimetres. In one embodiment, the aerosol-generating segment may have an outer diameter of about 7.2 millimetres.

The aerosol-generating article may comprise a filter plug. The filter plug may be located at a mouth end of the aerosol-generating article. The filter plug may be a cellulose acetate filter plug. In some embodiments, the filter plug may have a length of about 5 millimetres to about 10 millimetres. In some preferred embodiments, the filter plug may have a length of about 7 millimetres.

The aerosol-generating article may comprise an outer wrapper. The outer wrapper may be formed from paper. The outer wrapper may be gas permeable at the aerosol-generating segment. In particular, in embodiments comprising a plurality of aerosol-forming substrates, the outer wrapper may comprise perforations or other air inlets at the interface between adjacent aerosol-forming substrates. Where a separation is provided between adjacent aerosol-forming substrates, the outer wrapper may comprise perforations or other air inlets at the separation. This may enable an aerosol-forming substrate to be directly provided with air that has not been drawn through another aerosol-forming substrate. This may increase the amount of air received by each aerosol-forming substrate. This may improve the characteristics of the aerosol generated from the aerosol-forming substrate.

The aerosol-generating article may also comprise a separation between the aerosol-forming substrate and the filter plug. The separation may be in the range of about 5 millimetres to about 25 millimetres. The separation may be about 18 millimetres.

Embodiments of the present disclosure will now be described, by way of example only, with reference to the accompanying drawings, in which.

Figure 1:
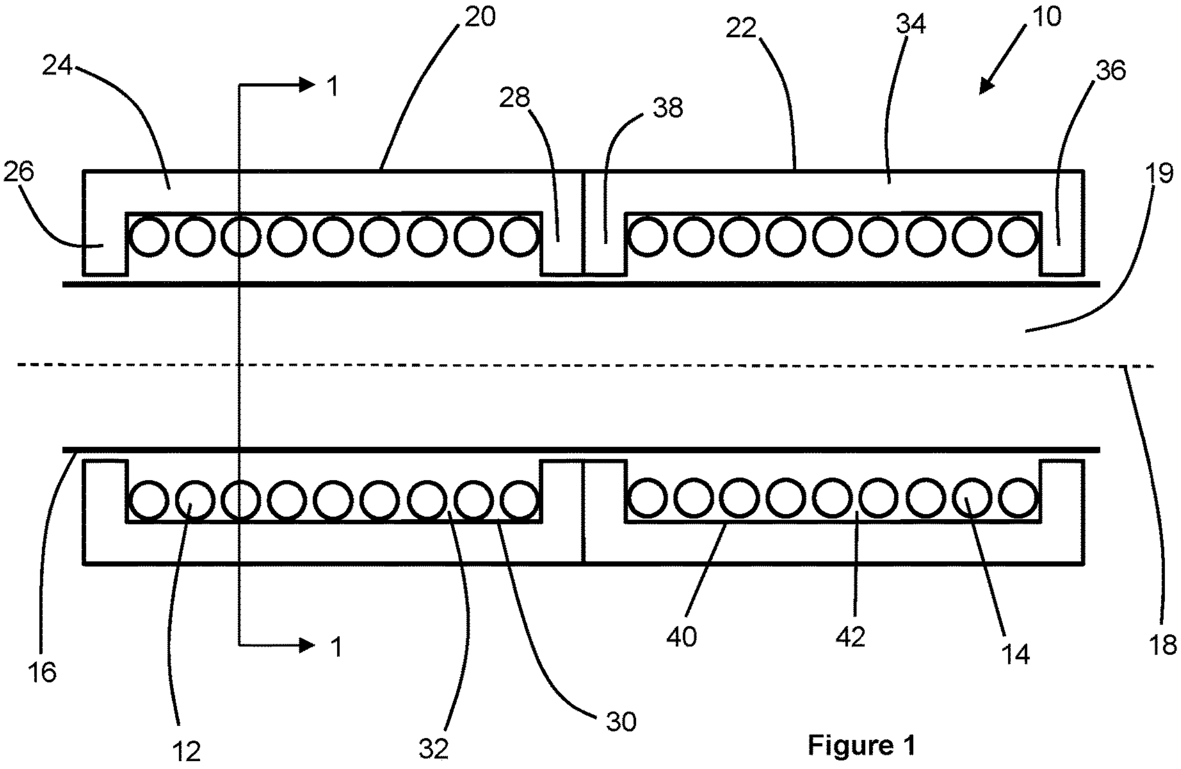
FIG. 1 shows a longitudinal cross-sectional view of an inductive heating arrangement according to a first embodiment of the present disclosure.

FIG. 1 shows a longitudinal cross-sectional view of an inductive heating arrangement 10 according to a first embodiment of the present disclosure. The inductive heating arrangement 10 comprises a first inductor coil 12 and a second inductor coil 14 positioned coaxially around a tubular susceptor 16 along a longitudinal axis 18 of the inductive heating arrangement 10. The susceptor 16 defines a cavity 19 in which an aerosol-forming substrate may be received for heating by the inductive heating arrangement 10.

The inductive heating arrangement 10 comprises a first flux concentrator 20 positioned around the first inductor coil 12 and a second flux concentrator 22 positioned around the second inductor coil 14. The first and second flux concentrators 20, 22 are each formed from a ferromagnetic material.

The first flux concentrator 20 has a tubular shape and comprises a first main portion 24 positioned around the first inductor coil 12, a first end portion 26 at a first end of the first main portion 24, and a second end portion 28 at a second end of the first main portion 24. The first and second end portions 26, 28 each have an inner diameter that is smaller than an inner diameter of the first main portion 24. An inner surface 30 of the first flux concentrator 20 defines a first annular channel 32 between the first end portion 26 and the second end portion 28. The first inductor coil 12 is positioned within the first annular channel 32 between the first end portion 26 and the second end portion 28.

The second flux concentrator 22 has a tubular shape and comprises a second main portion 34 positioned around the second inductor coil 14, a third end portion 36 at a first end of the second main portion 34, and a fourth end portion 38 at a second end of the second main portion 34. The third and fourth end portions 36, 38 each have an inner diameter that is smaller than an inner diameter of the second main portion 34. An inner surface 40 of the second flux concentrator 22 defines a second annular channel 42 between the third end portion 36 and the fourth end portion 38. The second inductor coil 14 is positioned within the second annular channel 42 between the third end portion 36 and the fourth end portion 38.

When a varying electric current is supplied to the first inductor coil 12, the first inductor coil 12 generates a varying magnetic field. The shape of the first flux concentrator 20, and in particular the first and second end portions 26, 28, distort the varying magnetic field so that the varying magnetic field is concentrated in a first portion of the susceptor 16 positioned within the first inductor coil 12. The varying magnetic field generated by the first inductor coil 12 induces eddy currents in the first portion of the susceptor 16, causing the first portion of the susceptor 16 to be heated. Advantageously, the concentration of the varying magnetic field in the first portion of the susceptor 16 by the first flux concentrator 20 reduces or minimises heating of a second portion of the susceptor 16 positioned within the second inductor coil 14 by the varying magnetic field generated by the first inductor coil 12.

When a varying electric current is supplied to the second inductor coil 14, the second inductor coil 14 generates a varying magnetic field. The shape of the second flux concentrator 22, and in particular the first and second end portions 36, 38, distort the varying magnetic field so that the varying magnetic field is concentrated in the second portion of the susceptor 16 positioned within the second inductor coil 14. The varying magnetic field generated by the second inductor coil 14 induces eddy currents in the second portion of the susceptor 16, causing the second portion of the susceptor 16 to be heated. Advantageously, the concentration of the varying magnetic field in the second portion of the susceptor 16 by the second flux concentrator 22 reduces or minimises heating of the first portion of the susceptor 16 positioned within the first inductor coil 12 by the varying magnetic field generated by the second inductor coil 14.

Figure 2:
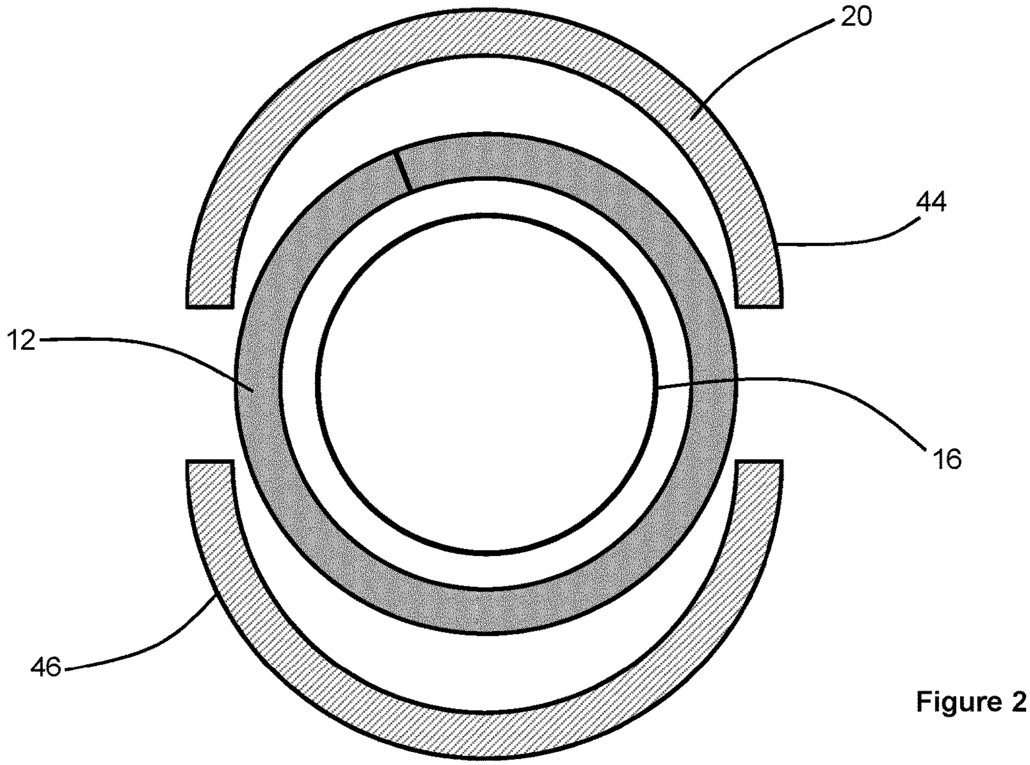
FIG. 2 shows a partially exploded transverse cross-sectional view of the inductive heating arrangement of FIG. 1 along line 1-1.

FIG. 2 shows a partially exploded transverse cross-sectional view of the inductive heating arrangement 10 of FIG. 1 along line 1-1. The first flux concentrator 20 comprises a discrete first part 44 having a semi-annular shape and a discrete second part 46 having a semi-annular shape. When the discrete first and second parts 44, 46 are brought together they define the tubular shape of the first flux concentrator 20. Advantageously, forming the first flux concentrator 20 from first and second parts 44, 46 each having a semi-annular shape facilitates assembly of the inductive heating assembly 10. For example, as shown in FIG. 2, the first inductor coil 12 may be positioned over the first portion of the susceptor 16. The first and second parts 44, 46 may then be positioned around the first inductor coil 12 and brought into contact with each other to form the first flux concentrator 20. The same arrangement can be used to assembly the second flux concentrator 22. In other words, the second flux concentrator 22 may also be formed from discrete first and second parts each having a semi-annular shape.

Figure 3:
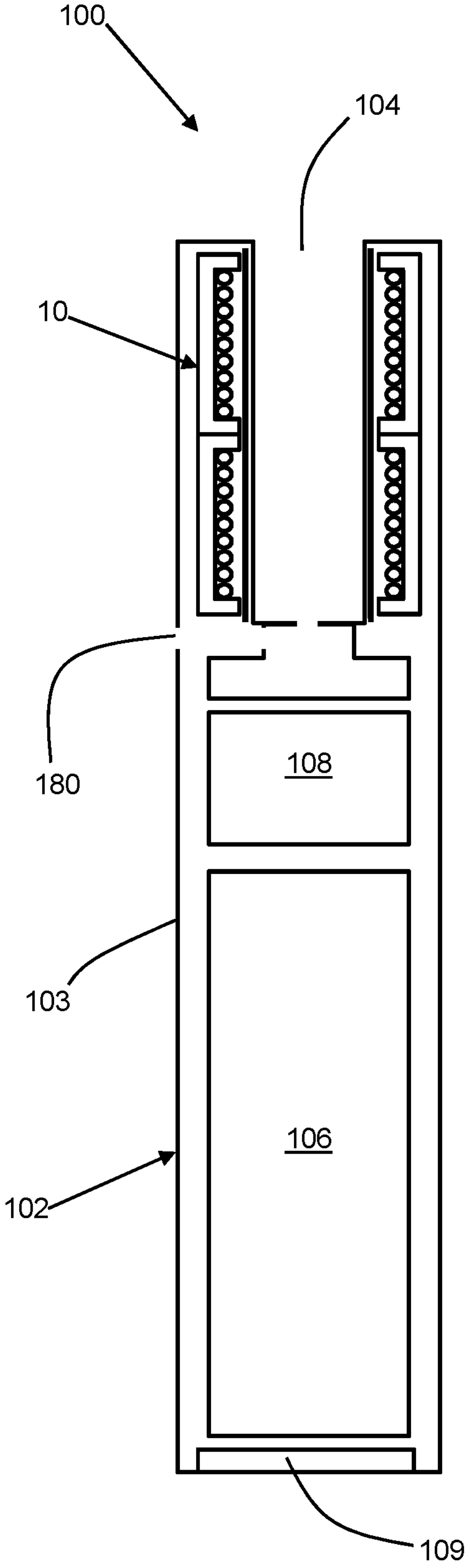
FIG. 3 shows a cross-sectional view of an aerosol-generating system comprising an aerosol-generating article and an aerosol-generating device comprising the inductive heating arrangement of FIG. 1.
Figure 3:
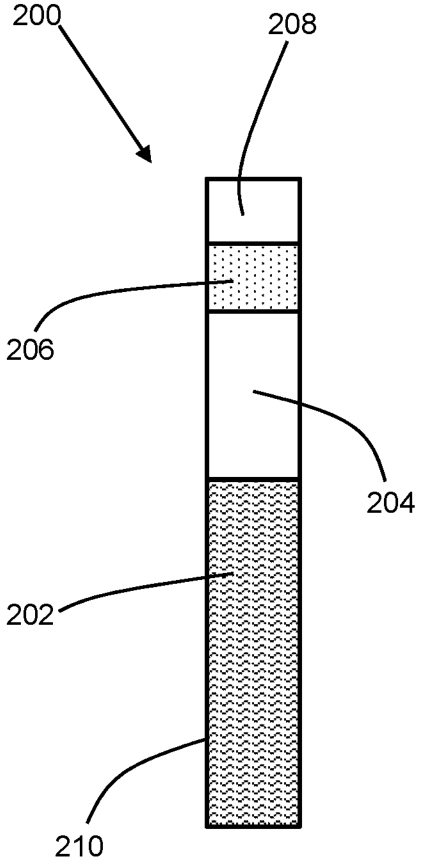

FIG. 3 shows a cross-sectional view of an aerosol-generating system 100 according to an embodiment of the present disclosure. The aerosol-generating system 100 comprises an aerosol-generating device 102 comprising the inductive heating arrangement 10 of FIG. 1. The aerosol-generating system 100 also comprises an aerosol-generating article 200.

The aerosol-generating device 102 comprises a substantially cylindrical device housing 103, with a shape and size similar to a conventional cigar. The device housing 103 defines a device cavity 104 at a proximal end. The device cavity 104 is substantially cylindrical, open at a proximal end, and substantially closed at a distal end, opposite the proximal end. The device cavity 104 is configured to receive a portion of the aerosol-generating article 200. Accordingly, the diameter of the device cavity 104 is substantially similar to the diameter of the aerosol-generating article 200.

The aerosol-generating device 102 further comprises a power supply 106, in the form of a rechargeable nickel-cadmium battery, a controller 108 in the form of a printed circuit board including a microprocessor, an electrical connector 109, and the inductive heating arrangement 10. The power supply 106, controller 108 and inductive heating arrangement 10 are all housed within the device housing 103. The inductive heating arrangement 10 of the aerosol-generating device 102 is arranged at the proximal end of the device 102, and is generally disposed around the device cavity 104. The electrical connector 109 is arranged at a distal end of the device housing 103, opposite the device cavity 104.

The controller 108 is configured to control the supply of power from the power supply 106 to the inductive heating arrangement 10. The controller 108 further comprises a DC/AC inverter, including a Class-D power amplifier, and is configured to supply at least one varying electric current to the inductive heating arrangement 10. The controller 108 is also configured to control recharging of the power supply 106 from the electrical connector 109. In addition, the controller 108 comprises a puff sensor (not shown) configured to sense when a user is drawing on an aerosol-generating article received in the device cavity 104.

The first inductor coil 12 is connected to the controller 108 and the power supply 106, and the controller 108 is configured to supply a varying electric current to the first inductor coil 12. When a varying electric current is supplied to the first inductor coil 12, the first inductor coil 12 generates a varying magnetic field, which heats the first portion of the susceptor 16 by induction.

The second inductor coil 14 is connected to the controller 108 and the power supply 106, and the controller 108 is configured to supply a varying electric current to the second inductor coil 14. When a varying electric current is supplied to the second inductor coil 14, the second inductor coil 14 generates a varying magnetic field, which heats the second portion of the susceptor 16 by induction.

The device housing 103 also defines an air inlet 180 in close proximity to the distal end of the device cavity 106. The air inlet 180 is configured to enable ambient air to be drawn into the device housing 103. An airflow pathway is defined through the device, between the air inlet 180 and an air outlet in the distal end of the device cavity 104, to enable air to be drawn from the air inlet 180 into the device cavity 104.

The aerosol-generating article 200 comprises an aerosol-forming substrate 202 in the form of a cylindrical rod and comprising tobacco. The cylindrical rod of aerosol-forming substrate 202 has a length substantially equal to the length of the device cavity 104. The aerosol-generating article 200 also comprises a tubular cooling segment 204, a filter segment 206, and a mouth end segment 208. The aerosol-forming substrate 202, the tubular cooling segment 204, the filter segment 206 and the mouth end segment 208 are held together by an outer wrapper 210.

Figure 4:
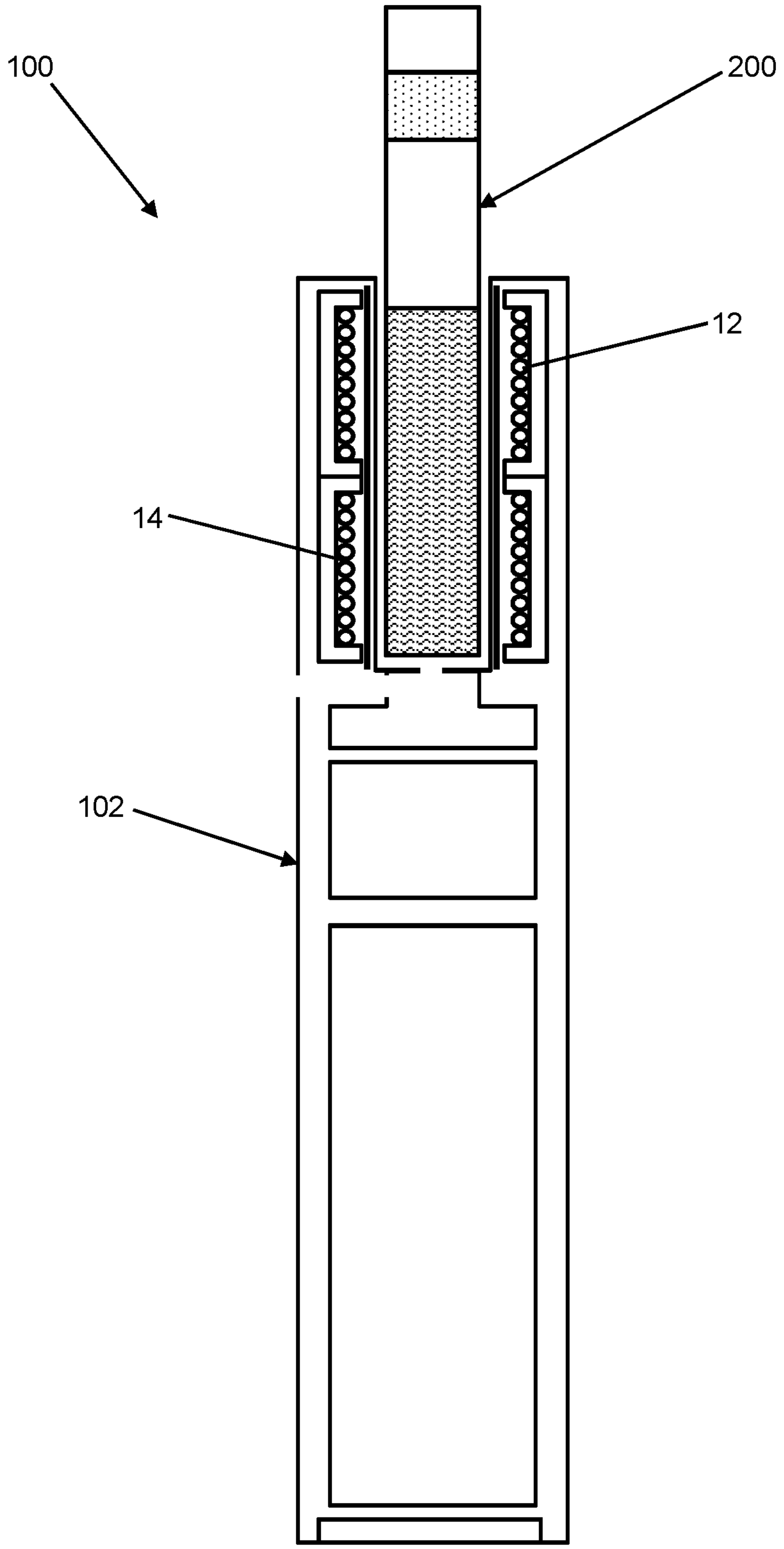
FIG. 4 shows the aerosol-generating system of FIG. 3 with the aerosol-generating article received within the aerosol-generating device.

As shown in FIG. 4, when the aerosol-forming substrate 202 of the aerosol-generating article 200 is received in the device cavity 104, the length of the aerosol-forming substrate 202 is such that the aerosol-forming substrate 202 extends along the length of the inductive heating arrangement 10.

In use, when an aerosol-generating article 200 is received in the device cavity 104, a user may draw on the proximal end of the aerosol-generating article 200 to inhale aerosol generated by the aerosol-generating system 100. When a user draws on the proximal end of the aerosol-generating article 200, air is drawn into the device housing 103 at the air inlet 180, and is drawn along the airflow pathway, into the device cavity 104. The air is drawn into the aerosol-generating article 200 at the proximal end of the aerosol-forming substrate 202 through the outlet in the distal end of the device cavity 104.

The controller 108 of the aerosol-generating device 102 is configured to supply power to the first and second inductor coils 12, 14 of the inductive heating arrangement 10 according to a predetermined heating profile during. The predetermined heating profile comprises supplying a varying electric current to the first inductor coil 12 to heat the first portion of the susceptor 16 to an operating temperature for a first time period. The predetermined heating profile also comprises supply a varying electric current to the second inductor coil 14 to heat the second portion of the susceptor 16 to an operating temperature for a second time period. In this embodiment, the first time period and the second time period partially overlap. In other words, the second time period begins when part of the first time period has elapsed, and the first time period ends when part of the second time period has elapsed. However, it will be appreciated that the controller 108 may be configured to supply power to the first and second inductor coils 12, 14 according to a different heating profile, depending on the desired delivery of aerosol to the user. In some embodiments, the aerosol-generating device 102 may be controllable by a user to change the heating profile.

Figure 5:
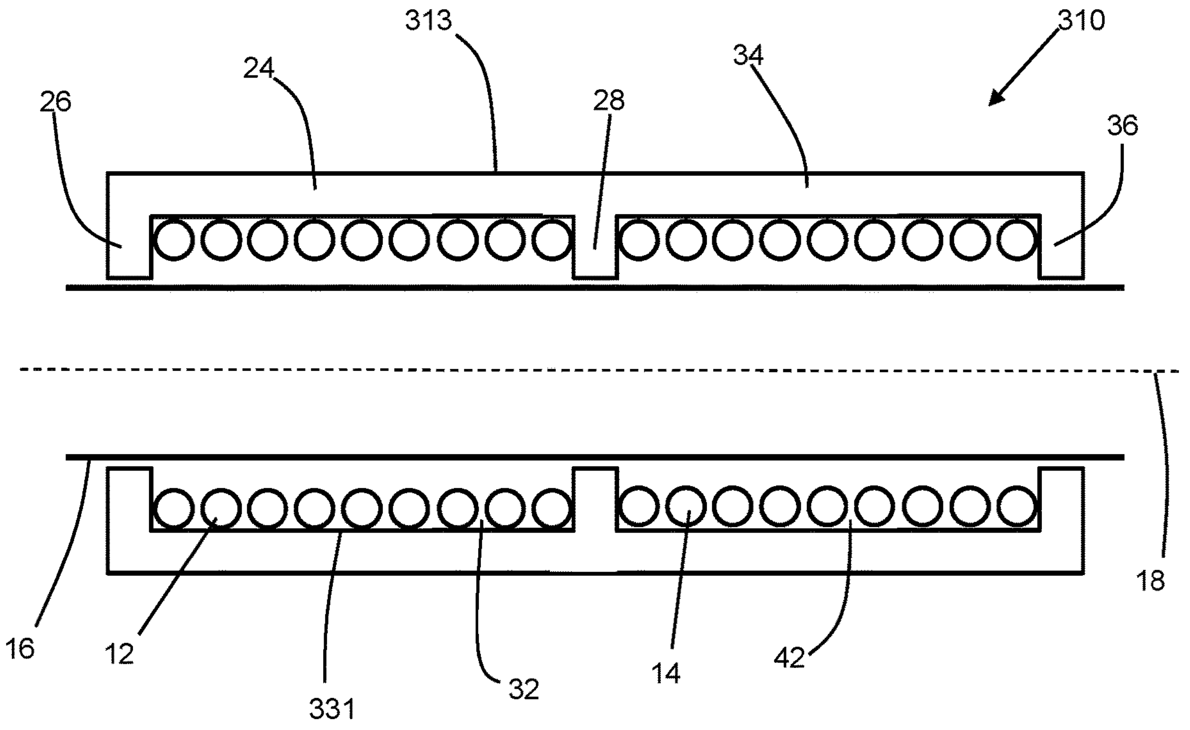
FIG. 5 shows a longitudinal cross-sectional view of an inductive heating arrangement according to a second embodiment of the present disclosure.

FIG. 5 shows a longitudinal cross-sectional view of an inductive heating arrangement 310 according to a second embodiment of the present disclosure. The inductive heating arrangement 310 shown in FIG. 5 is similar to the inductive heating arrangement 10 of FIG. 1 and like reference numerals are used to designate like parts.

The inductive heating arrangement 310 comprises a single flux concentrator 313 having a tubular shape and comprising the first main portion 24 positioned around the first inductor coil 12, the second main portion 34 positioned around the second inductor coil 14, the first end portion 26 at a first end of the first main portion 24, the second end portion 28 at the second ends of the first and second main portions 24, 34, and the third end portion 36 at the first end of the second main portion 34. The inner surface 331 of the flux concentrator 313 defines the first annular channel 32 between the first end portion 26 and the second end portion 28, and the second annular channel 42 between the second end portion 28 and the third end portion 36. Preferably, the flux concentrator 313 comprises discrete first and second portions each having a semi-annular shape as described with reference to FIG. 2 for the inductive heating arrangement 10.

Figure 6:
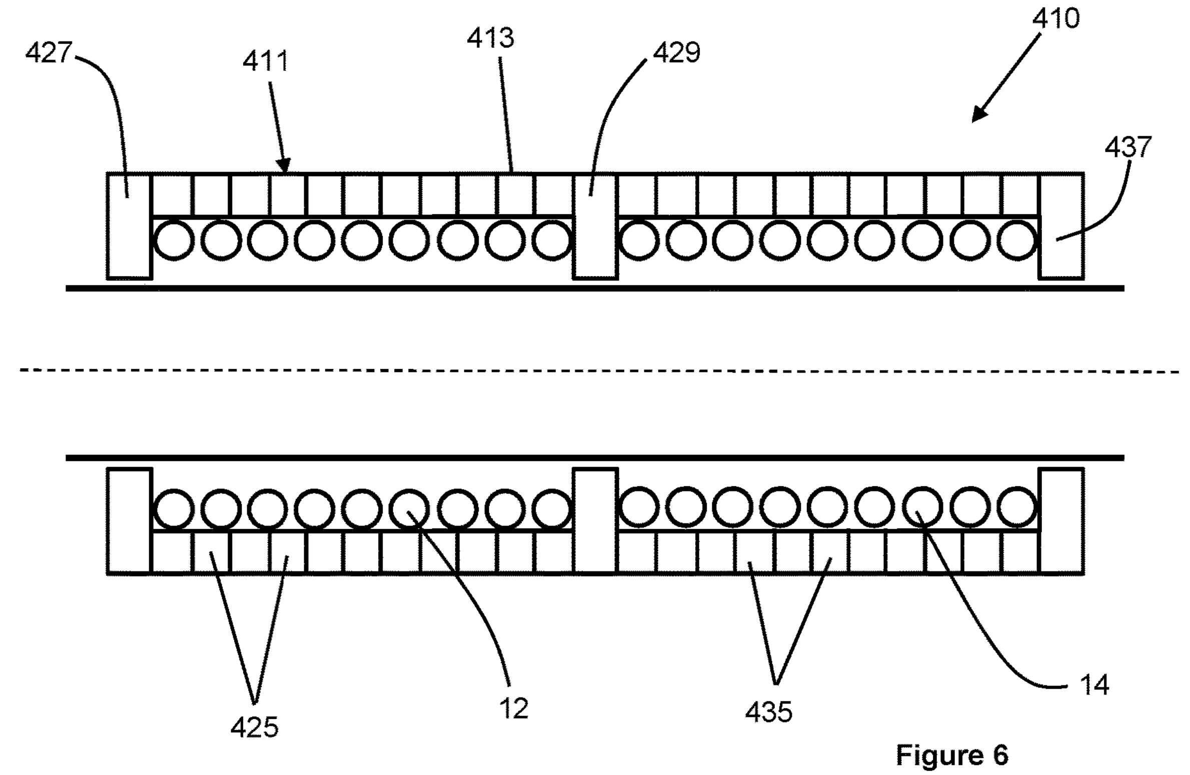
FIG. 6 shows a longitudinal cross-sectional view of an inductive heating arrangement according to a third embodiment of the present disclosure.

FIG. 6 shows a longitudinal cross-sectional view of an inductive heating arrangement 410 according to a third embodiment of the present disclosure. The inductive heating arrangement 410 shown in FIG. 6 is similar to the inductive heating arrangement 310 of FIG. 5 and like reference numerals are used to designate like parts.

The inductive heating arrangement 410 comprises a single flux concentrator 413 comprising a plurality of discrete annular segments 411 positioned consecutively to define the tubular shape of the flux concentrator 413. The plurality of discrete annular segments 411 comprises a first discrete annular segment 427 defining the first end portion 26 of the flux concentrator 413, a second discrete annular segment 429 defining the second end portion 28 of the flux concentrator 413, and a third discrete annular segment 437 defining the third end portion 36 of the flux concentrator 413. The plurality of discrete annular segments 411 also comprises a plurality of first intermediate discrete annular segments 425 defining the first main portion 24 of the flux concentrator 413, and a plurality of second intermediate discrete annular segments 435 defining the second main portion 34 of the flux concentrator 413.

It will be appreciated that the first and second flux concentrators 20, 22 of the inductive heating arrangement 10 of FIG. 1 may each be formed from a plurality of discrete annular segments in the same manner as the flux concentrator 413 of FIG. 6.

The invention claimed is:

1. An inductive heating arrangement, comprising:

a first inductor coil configured to generate a first varying magnetic field when a varying electric current flows through the first inductor coil;

a second inductor coil configured to generate a second varying magnetic field when a varying electric current flows through the second inductor coil; and a flux concentrator disposed around the first inductor coil and configured to distort the first varying magnetic field generated by the first inductor coil, wherein the flux concentrator has a tubular shape and comprises:

a main portion disposed around the first inductor coil, the main portion having an inner diameter, a first end, and a second end, a first end portion at the first end of the main portion, the first end portion having an inner diameter, wherein the inner diameter of the first end portion is smaller than the inner diameter of the main portion, and a second end portion at the second end of the main portion, the second end portion having an inner diameter, wherein the inner diameter of the second end portion is smaller than the inner diameter of the main portion, wherein an inner surface of the flux concentrator defines an annular channel between the first end portion and the second end portion, and wherein the first inductor coil is disposed within the annular channel between the first end portion and the second end portion.

2. The inductive heating arrangement according to claim 1, wherein the flux concentrator is a first flux concentrator, wherein the main portion is a first main portion disposed around the first inductor coil, wherein the annular channel is a first annular channel, wherein the inductive heating arrangement comprises a second flux concentrator disposed around the second inductor coil to distort the second varying magnetic field generated by the second inductor coil, and wherein the second flux concentrator has a tubular shape and comprises:

a second main portion disposed around the second inductor coil, the second main portion having an inner diameter, a first end, and a second end, a third end portion at the first end of the second main portion, the third end portion having an inner diameter, wherein the inner diameter of the third end portion is smaller than the inner diameter of the second main portion, and a fourth end portion at the second end of the second main portion, the fourth end portion having an inner diameter, wherein the inner diameter of the fourth end portion is smaller than the inner diameter of the second main portion, wherein an inner surface of the second flux concentrator defines a second annular channel between the third end portion and the fourth end portion, and wherein the second inductor coil is disposed within the second annular channel between the third end portion and the fourth end portion.

3. The inductive heating arrangement according to claim 1, wherein the flux concentrator is disposed around the first inductor coil and the second inductor coil to distort the first and second varying magnetic fields generated by the first and second inductor coils, wherein the main portion is a first main portion disposed around the first inductor coil, wherein the annular channel is a first annular channel, wherein the flux concentrator further comprises:

a second main portion disposed around the second inductor coil, the second main portion having an inner diameter, a first end, and a second end, and a third end portion at the first end of the second main portion, the third end portion having an inner diameter, wherein the inner diameter of the third end portion is smaller than the inner diameter of the second main portion, wherein the second end portion is at the second end of the second main portion so that the second end portion is disposed between the first main portion and the second main portion, wherein the inner diameter of the second end portion is smaller than the inner diameter of the second main portion, wherein the inner surface of the flux concentrator defines a second annular channel between the second end portion and the third end portion, and wherein the second inductor coil is disposed within the second annular channel between the second end portion and the third end portion.

4. The inductive heating arrangement according to claim 1, wherein each inductor coil and each respective annular channel are disposed concentrically about a longitudinal axis, and wherein a cross-sectional shape of each annular channel in a longitudinal direction along the longitudinal axis is U-shaped.

5. The inductive heating arrangement according to claim 4, wherein the U-shaped cross-sectional shape of each annular channel is a rectangular U-shaped cross-sectional shape.

6. The inductive heating arrangement according to claim 1, wherein each inductor coil and each respective annular channel are disposed concentrically about a longitudinal axis, wherein each flux concentrator is formed from a discrete first part having a semi-annular shape and a discrete second part having a semi-annular shape, and wherein the first part and the second part together define the tubular shape of the flux concentrator.

7. The inductive heating arrangement according to claim 1, wherein each flux concentrator comprises a plurality of discrete annular segments disposed consecutively to define the tubular shape of the flux concentrator.

8. The inductive heating arrangement according to claim 7, further comprising:

a first discrete annular segment defining the first end portion of the flux concentrator;

a second discrete annular segment defining the second end portion of the flux concentrator; and at least one intermediate discrete annular segment defining the main portion of the flux concentrator.

9. The inductive heating arrangement according to claim 2, wherein each flux concentrator comprises a plurality of discrete annular segments disposed consecutively to define the tubular shape of the flux concentrator, the inductive heating arrangement further comprising:

a first discrete annular segment defining the first end portion of the flux concentrator;

a second discrete annular segment defining the second end portion of the flux concentrator;

a third discrete annular segment defining the third end portion of the second flux concentrator;

a fourth discrete annular segment defining the fourth end portion of the second flux concentrator;

at least one first intermediate discrete annular segment defining the first main portion of the first flux concentrator; and at least one second intermediate discrete annular segment defining the second main portion of the second flux concentrator.

10. The inductive heating arrangement according to claim 3, wherein each flux concentrator comprises a plurality of discrete annular segments disposed consecutively to define the tubular shape of the flux concentrator, the inductive heating arrangement further comprising:

a first discrete annular segment defining the first end portion of the flux concentrator;

a second discrete annular segment defining the second end portion of the flux concentrator;

a third discrete annular segment defining the third end portion of the flux concentrator; and at least one intermediate discrete annular segment defining the main portion of the flux concentrator;

wherein the at least one intermediate discrete annular segment defining the main portion of the flux concentrator comprises at least one first intermediate discrete annular segment defining the first main portion and at least one second intermediate discrete annular segment defining the second main portion.

11. The inductive heating arrangement according to claim 1, wherein each flux concentrator comprises a material having a relative magnetic permeability of at least 5 at a frequency of between 6 megahertz and 8 megahertz and a temperature of 25 degrees Celsius.

12. The inductive heating arrangement according to claim 1, wherein each flux concentrator comprises a ferromagnetic material.

13. An aerosol-generating device, comprising:

an inductive heating arrangement according to claim 1;

a power supply; and a controller configured to supply a varying electric current from the power supply to each inductor coil.

* * * * *